US012777424B2

(12) United States Patent
Wigren et al.

(10) Patent No.: US 12,777,424 B2
(45) Date of Patent: Oct. 27, 2026

(54) TECHNIQUES FOR PASSIVE INTERMODULATION AVOIDANCE

(71) Applicant: Telefonaktiebolaget LM Ericsson (publ), Stockholm (SE)

(72) Inventors: Torbjörn Wigren, Uppsala (SE); Mark Wyville, Ottawa (CA); Martin Allander, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 220 days.

(21) Appl. No.: 18/841,590

(22) PCT Filed: Mar. 7, 2022

(86) PCT No.: PCT/SE2022/050215

§ 371 (c)(1),
(2) Date: Aug. 26, 2024

(87) PCT Pub. No.: WO2023/172170

PCT Pub. Date: Sep. 14, 2023

(65) Prior Publication Data

US 2025/0184910 A1 Jun. 5, 2025

(51) Int. Cl.

*H04B 7/00* (2006.01)
*H04B 1/04* (2006.01)
*H04W 52/18* (2009.01)

(52) U.S. Cl.

CPC .......... *H04W 52/18* (2013.01); *H04B 1/0475* (2013.01)

(58) Field of Classification Search

CPC . H04W 52/146; H04W 52/18; H04W 52/241; H04W 52/243; H04W 52/248;

(Continued)

(56) References Cited

U.S. PATENT DOCUMENTS

| | | | | |
|---|---|---|---|---|
| 9,941,959 | B2 * | 4/2018 | Heath | H04L 43/045 |
| 10,389,476 | B2 * | 8/2019 | Stephenne | H04L 1/0009 |
| 10,924,141 | B2 | 2/2021 | Cyzs et al. | |
| 10,924,959 | B2 | 2/2021 | Zhu et al. | |
| 11,290,194 | B1 | 3/2022 | Wurtenberger et al. | |
| 11,758,570 | B2 * | 9/2023 | Hakanson | H04W 72/12 370/281 |

(Continued)

FOREIGN PATENT DOCUMENTS

| | | |
|---|---|---|
| CN | 106301417 A | 1/2017 |
| CN | 107154826 A | 9/2017 |

(Continued)

OTHER PUBLICATIONS

Non-Final Office Action dated May 15, 2026 issued in U.S. Appl. No. 18/842,254, consisting of 37 pages.

(Continued)

*Primary Examiner* — Tuan Pham
(74) *Attorney, Agent, or Firm* — Weisberg I.P. Law, P.A.

(57) ABSTRACT

Mechanisms for passive intermodulation (PIM) avoidance. A method is performed by a controller. The method includes determining, based on presence of uplink PIM, to which fractions of transmission resources within a transmission slot a transmission power reduction factor is to be applied. The fraction of transmission resources is, in a logarithmic domain and according to a feedback control loop, determined as a function of a comparison between a measured improvement of the uplink PIM when having applied the transmission power reduction factor in a most recent transmission slot and a reference value for the improvement of the uplink PIM. The measured improvement of the uplink PIM is given by, in each transmission slot, probing a radio channel over which the uplink PIM is received. The method includes applying the transmission power reduction factor to the determined fraction of transmission resources within the transmission slot during transmission of a signal.

20 Claims, 13 Drawing Sheets

(58) Field of Classification Search
CPC ...... H04B 1/0475; H04B 1/10; H04B 1/7097; H04B 1/7103; H04B 1/711
See application file for complete search history.

(56) References Cited

U.S. PATENT DOCUMENTS

| | | | |
|---|---|---|---|
| 11,990,976 | B2 | 5/2024 | Abdelmonem |
| 2013/0182569 | A1 | 7/2013 | Bertrand et al. |
| 2017/0237484 | A1 | 8/2017 | Heath et al. |
| 2018/0359048 | A1 | 12/2018 | Stephenne |
| 2019/0058534 | A1 | 2/2019 | Anderson |
| 2019/0320444 | A1 | 10/2019 | Hakanson et al. |
| 2020/0296729 | A1 | 9/2020 | Lindoff et al. |
| 2021/0168730 | A1 | 6/2021 | Tacconi et al. |
| 2021/0258096 | A1 | 8/2021 | Mann et al. |
| 2021/0345349 | A1 | 11/2021 | Fleischer et al. |

FOREIGN PATENT DOCUMENTS

| | | | |
|---|---|---|---|
| EP | 2648336 | A1 | 10/2013 |
| EP | 3687074 | A1 | 7/2020 |
| EP | 3890390 | A1 | 10/2021 |
| WO | 2017157461 | A1 | 9/2017 |
| WO | 2019220179 | A1 | 11/2019 |
| WO | 2019239196 | A1 | 12/2019 |
| WO | 2020208400 | A1 | 10/2020 |

OTHER PUBLICATIONS

International Search Report and Written Opinion dated Nov. 15, 2022 for International Application No. PCT/SE2022/050215 filed Mar. 7, 2022; consisting of 9 pages.

Lunden, O-P., et al., Linearization of BJTs with Logarithmic Predistortion; 2019 Radio and Wireless Symposium; Jan. 20, 2019; consisting of 3 pages.

International Search Report and Written Opinion dated Nov. 14, 2022 for International Application No. PCT/SE2022/050216 filed Mar. 7, 2022; consisting of 12 pages.

European Search Report dated Mar. 7, 2025 for Application No. 22931156.8, consisting of 5 pages.

European Search Report dated Mar. 13, 2025 for Application No. 22931157.6, consisting of 5 pages.

* cited by examiner

TECHNIQUES FOR PASSIVE INTERMODULATION AVOIDANCE

CROSS-REFERENCE TO RELATED APPLICATION

This application is a Submission Under 35 U.S.C. § 371 for U.S. National Stage Patent Application of International Application Number: PCT/SE2022/050215, filed Mar. 7, 2022 entitled "TECHNIQUES FOR PASSIVE INTERMODULATION AVOIDANCE," the entirety of which is incorporated herein by reference.

TECHNICAL FIELD

Embodiments presented herein relate to a method, a controller, a computer program, and a computer program product for passive intermodulation (PIM) avoidance.

BACKGROUND

In general terms, PIM is caused by passive objects, such as filters, duplexers, connectors, antennas and so forth, exhibiting nonlinear behavior in the vicinity of radio signals. PIM can cause an interference signal to be generated that can couple into a receiver and degrade the receiver's sensitivity.

Depending on the location of the component that generates the PIM, the PIM is categorized as either internal or external. For example, PIM generated by the filters of the transmission (TX) radio chains in the antenna system at the cell site, loose cable connections, dirty connectors, poor performance duplexers, and aged antennas, is called internal PIM whereas PIM generated by a metal fence on the roof top of a building, a metal roof, or even a drainpipe, in vicinity of the cell site is called external PIM. External PIM thus refers to the case where the PIM occurs after the signals have left the transmitter antenna with the resultant intermodulation reflecting back into the receiver. PIM might cause the transmission power of the cell site to be backed off in order to avoid PIM to affect the receiver (RX) radio chains in the antenna system of the cell site, thus compromising the network performance. For example, a 1-dB drop in uplink sensitivity caused by PIM might reduce coverage by as much as 11% in a macro network. Further, PIM is a super-linear effect, meaning that the PIM power can increase as a power of the downlink transmit power. For example, for third-order PIM every decibel (dB) of transmit power increase could result in 3 dB of PIM power increase in the uplink.

To explain how PIM is generated at a high level, consider FIG. 1. FIG. 1 at (a) illustrates a communications network 100 where embodiments presented herein can be applied. The communications network 100 comprises an access network node 110, such as a radio access network node, radio base station, base transceiver station, node B (NB), evolved node B (eNB), gNB, access point, integrated access and access node, etc. configured to provide network access to user equipment 120*a*, 120*b* in carriers 120*a*, 120*b*. A PIM source 130 is located in the vicinity of the antenna system of the access network node 110. FIG. 1 at (b) shows a representation of the power spectral density (PSD) as a function of frequency. In the example of FIG. 1, downlink transmission in two frequency bands with carrier frequencies $f_1$ and $f_2$ mix nonlinearly in the PIM source 130. This results in new interference signals with a variety of center frequencies. Only one of these signals is shown in the power spectral density, centered at the frequency $f_{PIM}=2f_1-f_2$. In this case, it is for illustrative purposes assumed that the linear combination $2f_1-f_2$ happens to be located within the uplink band of the access network node 110, manifesting itself as additional uplink interference. The uplink radio channel for the access network node 110 is marked at reference numeral 140, and the uplink frequency band for the access network node 110 is marked at reference numeral 150. The interference typically has a wider bandwidth than the downlink signals that caused this uplink PIM. This wider bandwidth is an effect of the nonlinear mixing.

PIM generation can be modeled starting with one or more signals transmitted in the downlink that impinge on a PIM source as follows. First, let $$y_k^\gamma(t)$$

be the received uplink PIM signal corresponding to the k:th downlink channel:

$$y_k^\gamma(t) = (h_k^\gamma * x_k)(t)$$

Here γ denotes the PIM source, $$h_k^\gamma$$

the k:th downlink channel to the PIM source, $x_k$ the transmitted signal and * denotes convolution. The nonlinear interference generation is modeled as a static nonlinear function;

$$x^\gamma(t) = f(\gamma, y_1^\gamma(t), \ldots, y_K^\gamma(t)),$$

Here $x^\gamma(t)$ is the uplink PIM signal, and $$f(\gamma, y_1^\gamma(t), \ldots, y_K^\gamma(t))$$

is the nonlinear function. The received PIM signal can thus be expressed as:

$$y^\gamma(t) = (h^\gamma * x^\gamma)(t).$$

Here $h^\gamma$ is here the uplink channel from the PIM source. An expansion of the nonlinear function can now be performed using multi-dimensional polynomials, as motivated by the Stone-Weirstrass theorem. Stochastic signal modeling gives the following Volterra series representation of the PIM signal after some computations:

$$y^\gamma(t) = \sum_n \left( \int \cdots \int H^n(\tau_1^1, \ldots, \tau_k^m, \ldots, \tau_K^{n_K}) \prod_{k=1}^{K} \prod_{m=1}^{n_k} x_k(t - \tau_k^m) d\tau_k^m \right)$$

$$H^n(\tau_1^1, \ldots, \tau_k^m, \ldots, \tau_K^{n_K}) = \int \int \left( \prod_{k=1}^{K} \prod_{m=1}^{n_k} f_\gamma^n h^\gamma(\tau) h_k^\gamma(\tau_k^m - \tau) \right) d\tau d\gamma.$$

Here $$\tau_k^m$$

denote the delay parameters of the Volterra series expansion. An evaluation of special cases of the above model verifies the frequency shift and spreading of signals outlined for FIG. 1 above. The details are omitted here. Note that the superscript $(\bullet)^n$ is the non-linear order of the PIM source.

Three techniques to mitigate the impact of PIM, namely uplink PIM cancellation, downlink PIM avoidance by beamformed transmission, and general power reducing PIM avoidance, will be briefly summarized next.

PIM cancellation algorithms are designed to estimate parts of the complete PIM channel from downlink transmission to uplink reception. Given the estimated signal, a predicted signal can be computed and subtracted from the received signal. In case the predicted signal is an accurate model of the received uplink PIM, a substantial reduction in the uplink PIM can be obtained. One common drawback of all PIM cancellation algorithms is the computational complexity. This computational complexity is much higher than that of conventional channel estimation since non-linear basis functions must be created. PIM cancellation also requires measurement of both downlink transmission and uplink PIM.

PIM avoidance by beamformed transmission aims at avoiding beams of an advanced antenna system used for transmission to be pointed in the direction of the PIM source. This might require estimation of the location of the PIM source, which might not be knowns in advance. Therefore, techniques have been proposed to estimate a subspace of the beam space generated by the antenna array system where the PIM source is located. Generation of beams in this subspace is then avoided for downlink transmissions. This technique is only applicable for advanced antenna systems, and thus for (radio) access network nodes equipped with large antenna arrays. Further, this technique limits the number of possible directions in which beams can be used for downlink transmission.

PIM avoidance in general is applicable to any type of access network node. Once the frequency bands in which downlink transmissions are used that causes the uplink PIM are identified, the uplink PIM can be reduced by at least periodically avoiding transmission in these identified frequency bands. PIM avoidance can thereby reduce the uplink PIM depending on how much of the frequency bands can be muted. For network deployments a set of restrictions is defined on how much muting in downlink transmissions is allowed, as an upper limit on how much downlink throughput and capacity can be sacrificed. The implication is that the muting might be implemented sporadically and non-continuously, essentially adding more variations to the uplink signal to interference and noise ratio (SINR). Variations in the SINR must be considered carefully when used in uplink link adaptation, since the uplink PIM is mixed with the interference from other user equipment 120*a*, 120*b*.

Hence, there is still a need for improved PIM mitigation techniques.

SUMMARY

An object of embodiments herein is to provide techniques for efficient PIM avoidance that does not suffer from the issues noted above, or where the above noted issues at least have been mitigated or reduced.

According to a first aspect there is presented a method for PIM avoidance. The method is performed by a controller. The method comprises determining, based on presence of uplink PIM, to which fractions of transmission resources within a transmission slot a transmission power reduction factor is to be applied. The fraction of transmission resources is, in a logarithmic domain and according to a feedback control loop, determined as a function of a comparison between a measured improvement of the uplink PIM when having applied the transmission power reduction factor in a most recent transmission slot and a reference value for the improvement of the uplink PIM. The measured improvement of the uplink PIM is given by, in each transmission slot, probing a radio channel over which the uplink PIM is received. The method comprises applying the transmission power reduction factor to the determined fraction of transmission resources within the transmission slot during transmission of a signal.

According to a second aspect there is presented a controller for PIM avoidance. The controller comprises processing circuitry. The processing circuitry is configured to cause the controller to determine, based on presence of uplink PIM, to which fractions of transmission resources within a transmission slot a transmission power reduction factor is to be applied. The fraction of transmission resources is, in a logarithmic domain and according to a feedback control loop, determined as a function of a comparison between a measured improvement of the uplink PIM when having applied the transmission power reduction factor in a most recent transmission slot and a reference value for the improvement of the uplink PIM. The measured improvement of the uplink PIM is given by, in each transmission slot, probing a radio channel over which the uplink PIM is received. The processing circuitry is configured to cause the controller to apply the transmission power reduction factor to the determined fraction of transmission resources within the transmission slot during transmission of a signal.

According to a third aspect there is presented a controller for PIM avoidance. The controller comprises a determine module configured to determine, based on presence of uplink PIM, to which fractions of transmission resources within a transmission slot a transmission power reduction factor is to be applied. The fraction of transmission resources is, in a logarithmic domain and according to a feedback control loop, determined as a function of a comparison between a measured improvement of the uplink PIM when having applied the transmission power reduction factor in a most recent transmission slot and a reference value for the improvement of the uplink PIM. The measured improvement of the uplink PIM is given by, in each transmission slot, probing a radio channel over which the uplink PIM is received. The controller comprises an apply module configured to apply the transmission power reduction factor to the determined fraction of transmission resources within the transmission slot during transmission of a signal.

According to a fourth aspect there is presented a computer program for PIM avoidance, the computer program comprising computer program code which, when run on a controller, causes the controller to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide efficient PIM avoidance that does not suffer from the issues noted above.

Advantageously, these aspects enable the minimum necessary fraction of transmission resources to be determined to which the transmission power reduction factor is to be applied. This minimized throughput losses in the downlink whilst maximizing the throughput in the uplink.

Advantageously, by repeatedly performing the probing, changes over time can be identified and the determination of fraction of transmission resources can be adapted accordingly.

Advantageously, these aspects enable globally stable feedback control, for repeated determination of which fraction of transmission resources to which the transmission power reduction factor is to be applied.

Advantageously, these aspects are applicable for all available downlink frequency bands, as well as for a selected fraction of all available downlink frequency bands, for a group of user equipment, as well as for a single user equipment.

Advantageously, the feedback control loop can be integrated with uplink link adaptation, since the control objective is to hold the PIM power interference with respect to the other interference at a small and constant level.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above, there is still a need for improved PIM mitigation techniques.

In this respect, as also noted above, PIM cancellation is associated with a very high computational complexity and requires measurements on multiple downlink and uplink transmissions with high sampling rate. PIM avoidance by beamformed transmission is limited to access network nodes equipped with advanced antenna systems. Traditional PIM avoidance techniques based on muting downlink transmissions may cause significant downlink throughput reductions.

At least some of the herein disclosed embodiments aim at addressing shortcomings of traditional PIM avoidance techniques by considering possible effects of the uplink when performing the PIM avoidance.

The embodiments disclosed herein in particular relate to mechanisms for PIM avoidance. In order to obtain such mechanisms there is provided a controller 1700, a method performed by the controller 1700, a computer program product comprising code, for example in the form of a computer program, that when run on a controller 1700, causes the controller 1700 to perform the method.

Figure 1:
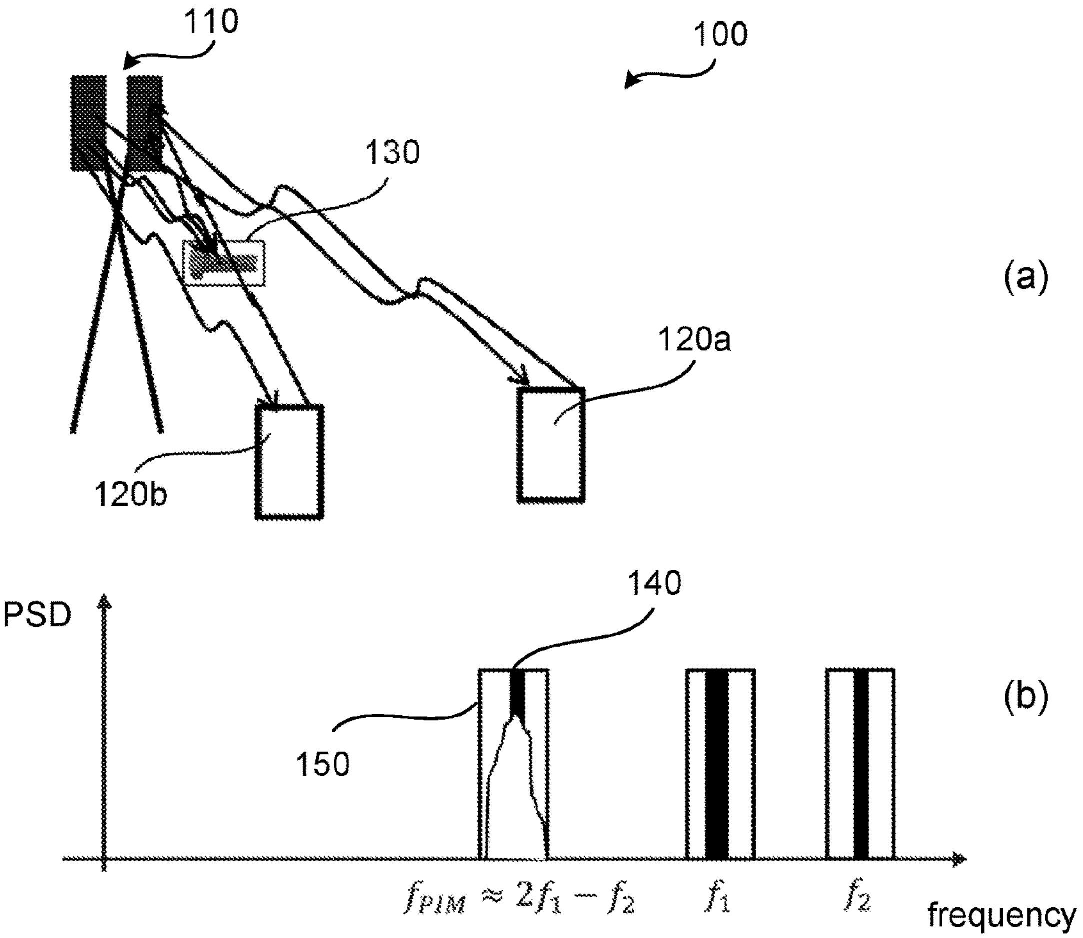
FIG. 1 is a schematic diagram illustrating a communications network according to embodiments.
Figure 2:
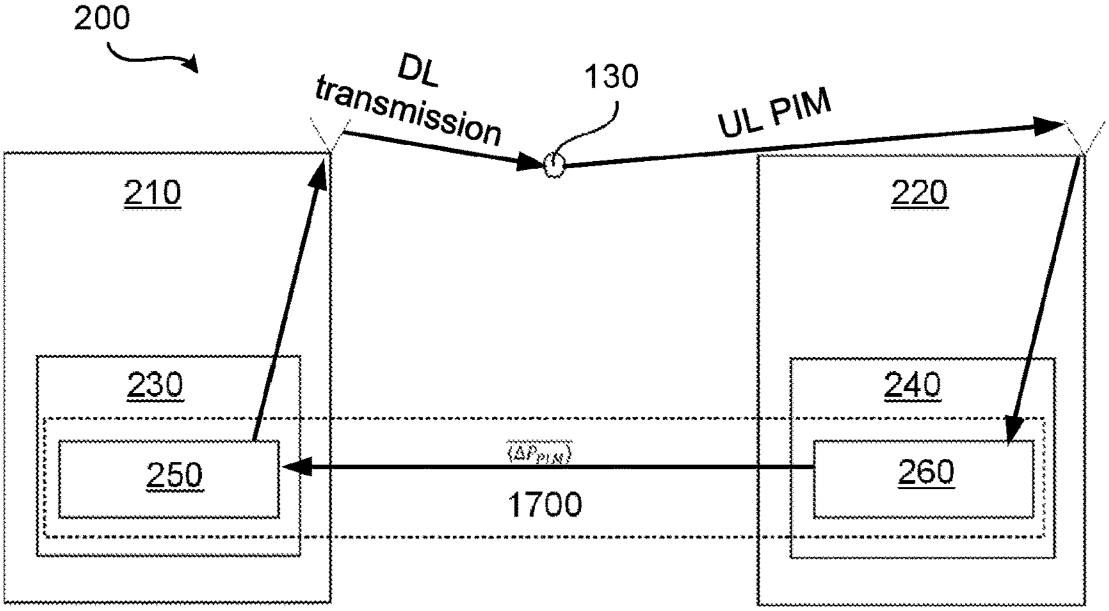
FIG. 2 is a block diagram of an access network node and a PIM source according to an embodiment.

FIG. 2 is a block diagram of a system 200 comprising an access network node 110 and a PIM source 130. In turn, the access network node 110 comprises a controller 1700. The access network node 110 has a transmitter part 210 and a receiver part 220. In turn, the transmitter part 210 comprises a downlink baseband part 230 and the receiver part 220 comprises an uplink baseband part 240. The controller 1700 is partly implemented in the transmitter part 210 and partly in the receiver part 220. In the transmitter part 210 the controller 1700 comprises a feedback control block 250 and in the receiver part 220 the controller 1700 comprises a probing block 260.

Figure 3:
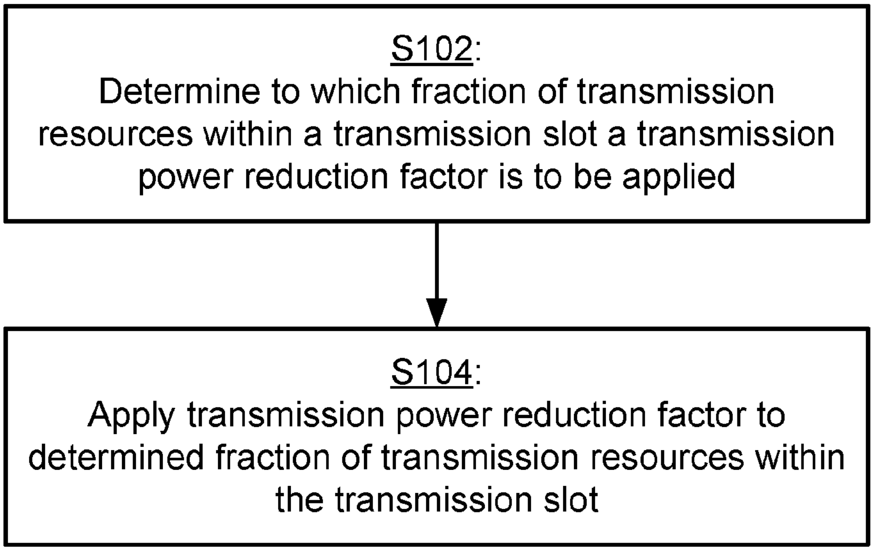
FIG. 3 is a flowchart of methods according to embodiments.

FIG. 3 is a flowchart illustrating embodiments of methods for PIM avoidance. The methods are performed by the controller 1700. The methods are advantageously provided as computer programs 1920.

S102: The controller 1700 determines, based on presence of uplink PIM, to which fractions of transmission resources within a transmission slot a transmission power reduction factor is to be applied.

The fraction of transmission resources is, in a logarithmic domain and according to a feedback control loop 400, 900, determined as a function of a comparison between a measured improvement of the uplink PIM when having applied the transmission power reduction factor in a most recent transmission slot and a reference value for the improvement of the uplink PIM. The fraction of transmission resources might be determined by the feedback control block 250.

The measured improvement of the uplink PIM is given by, in each transmission slot, probing a radio channel over which the uplink PIM is received. The probing might be implemented in the probing block 260.

S104: The controller 1700 applies the transmission power reduction factor to the determined fraction of transmission resources within the transmission slot during transmission of a signal.

Embodiments relating to further details of PIM avoidance as performed by the controller 1700 will now be disclosed.

It is appreciated that there could be different types of control loops. In some embodiments, the feedback control loop is either an integral (I) feedback control loop or a proportional integral (PI) feedback control loop. In some examples, the controller is therefore referred to as either an I controller or a PI controller.

It is appreciated that there could be different types of transmission resources to which the transmission power reduction factor is applied. In some non-limiting examples, the transmission resources are physical resource blocks (PRBs).

It is appreciated that there could be different time intervals at which the probing is performed. In some non-limiting examples, the probing is performed between once every 10th to once every 1000th transmission slot, preferably between once every 25th to every 400th transmission slot, more preferably between once every 50th to once every 150th transmission slot, even more preferably between once every 75th to once every 125th transmission slot.

It is appreciated that there could be different ways in which the transmission power reduction factor is applied to, and thus affects, the determined fraction of transmission resources within the transmission slot. In some non-limiting examples, applying the transmission power reduction factor comprises any, or any combination, of: muting the transmission resources to which the transmission power reduction factor is applied, reducing transmission power of the transmission resources to which the transmission power reduction factor is applied, limiting downlink load in at least one carrier to a fixed limit, minimizing downlink load in at least one carrier to a fixed limit, limiting the downlink load from a certain side of downlink carriers when considered in the frequency domain.

Figure 4:
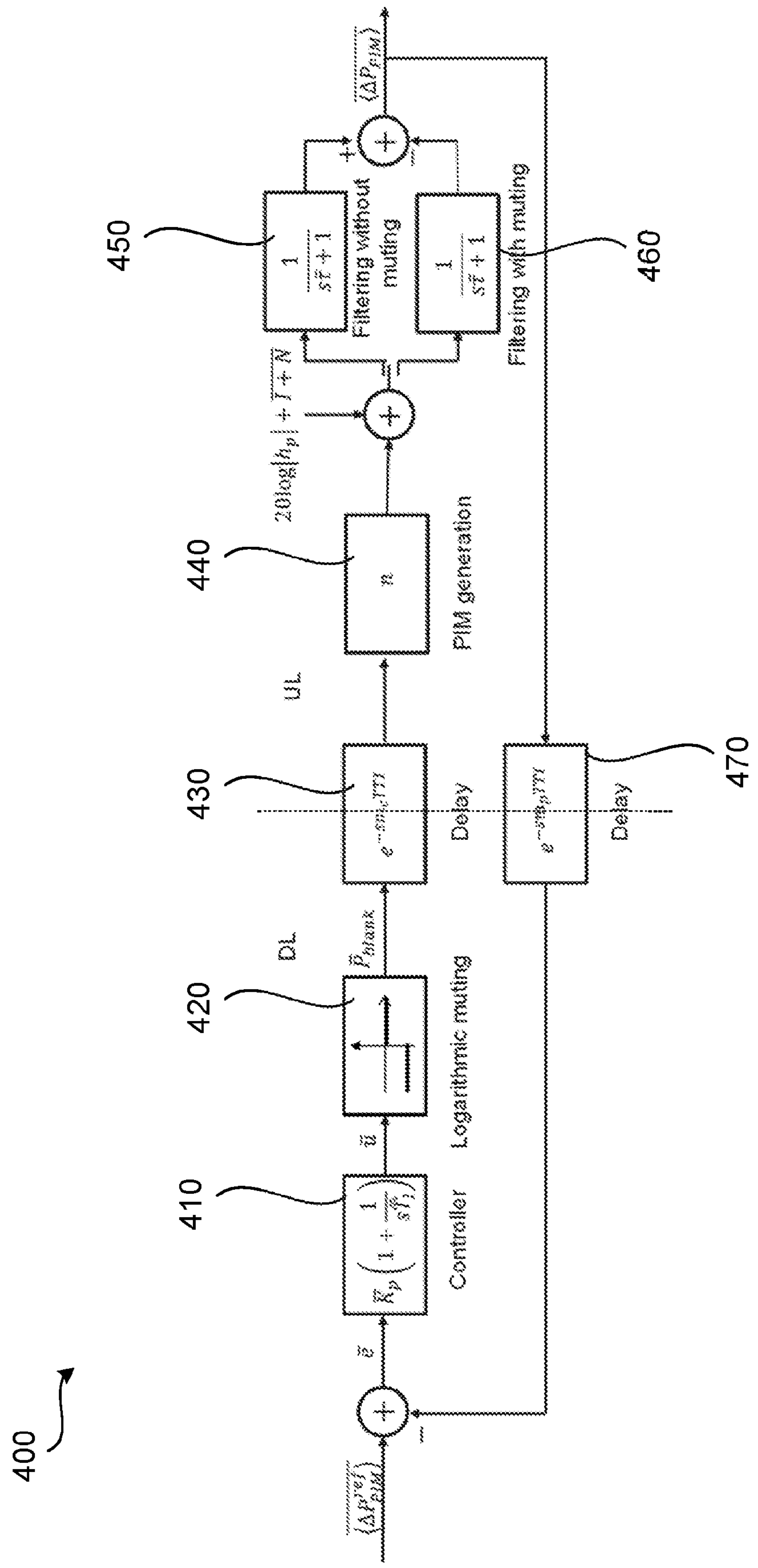
FIG. 4 is a block diagram of a controller implementing a control loop according to an embodiment.

Reference is next made to FIG. 4 in which is shown a block diagram of a feedback control loop 400 as implemented by the controller according to embodiments disclosed herein. The feedback control loop 400 is executed in the logarithmic domain. For ease of description, the notation used in the feedback control loop 400 is given mainly in the frequency domain where s is the Laplace transform variable. The different symbols have meanings as defined in Table 1.

TABLE 1

| List of symbols and their meaning | |
|---|---|
| Symbol | Meaning |
| $\overline{\langle \Delta P_{PIM}^{ref} \rangle}$ | reference value for the UL PIM improvement, in dB |
| $\overline{\langle \Delta P_{PIM} \rangle}$ | measured UL PIM improvement, in dB |
| $e^{-sm_pTTI}$ | reporting delay, where $m_p$ is an integer that represents the delay factor in terms of number of TTIs (implemented in the delay module 470) |

TABLE 1-continued

| List of symbols and their meaning | |
|---|---|
| Symbol | Meaning |
| TTI | transmission time interval |
| $\bar{e}(s)$ | control error |
| $\bar{K}_P$ | proportional gain of the proportional integrating controller (implemented in the controller module 410) |
| $\bar{T}_I$ | integration time of the proportional integrating controller (implemented in the controller module 410) |
| $\bar{u}(s)$ | control signal |
| $\bar{P}_{blanked}$ | fractionally muted power, in dB |
| $e^{-sm_cTTI}$ | control delay, where $m_c$ is an integer that represents the delay factor in terms of number of TTIs (implemented in the delay module 430) |
| n | (highest) PIM order (implemented in the PIM generation module 440) |
| $20\log(\lvert h_p \rvert)$ | PIM channel power, in dB |
| $\overline{I+N}$ | interference plus noise power, originating from other user equipment and receiver noise |
| $\bar{\tau}$ | filtering time, in seconds (as in filtering modules 450, 460) |

Figure 5:
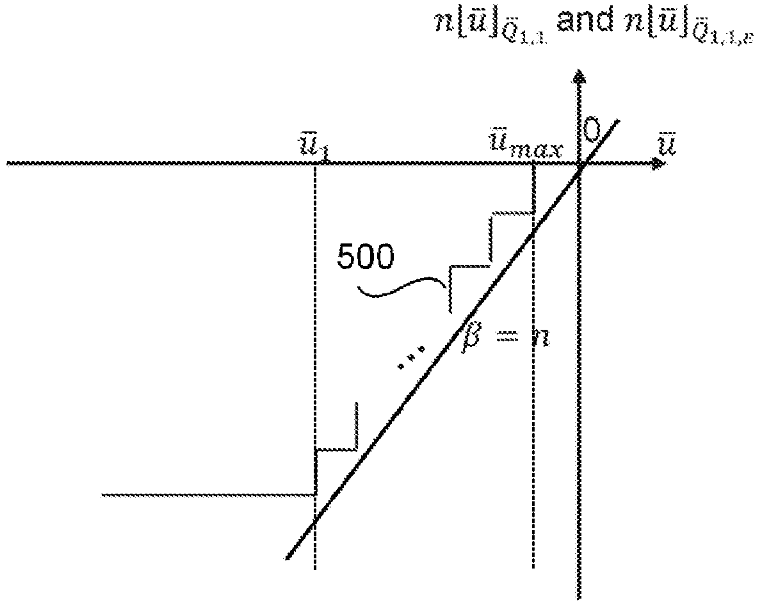
FIG. 5 schematically illustrates a quantization function according to an embodiment.

For ease of description, in the remaining of this disclosure, application of the transmission power reduction factor to the determined fraction of transmission resources will be exemplified by muting a fraction of PRBs. In this respect, selective and dynamic muting of a fraction of the PRBs means that PRBs only in the needed fraction of the frequency band, to achieve a certain PIM level, are muted. Traditionally, all PRBs in the frequency band, or the frequency band corresponding to certain user(s) are muted. The fractional muting (implemented in the logarithmic muting module 420) might be implemented in the scheduler, that then only schedules the blocks of PRBs that are not marked as muted. The scheduling typically schedules blocks of PRBs and can be described by FIG. 5. In FIG. 5 is at 500 shown $n\lfloor\bar{u}\rfloor_{\bar{Q}_{1,1}}$ as a function of $\bar{u}$. Here, $n\lfloor\bar{u}\rfloor_{\bar{Q}_{1,1}}$ expresses in the logarithmic domain the PIM effect of the number of PRB blocks to, per transmission slot, be muted. The quantization function using $n\lfloor\bar{u}\rfloor_{\bar{Q}_{1,1}}$ (implemented in the logarithmic muting module 420) can be expressed as:

$$n\lfloor\bar{u}\rfloor_{\bar{Q}_{1,1}} = \begin{cases} 0 & \text{if } \bar{u} \geq \bar{u}_{max} \\ 10n\log\left(Q_{PRB}\,\text{floor}\left((\bar{u}_1 + Q_{PRB})/Q_{PRB}\right)/N_{PRB}\right) & \text{if } \bar{u} < \bar{u}_1 \\ 10n\log\left(Q_{PRB}\,\text{floor}\left((\bar{u} + Q_{PRB})/Q_{PRB}\right)/N_{PRB}\right) & \text{else} \end{cases},$$

Here, $Q_{PRB}$ is the number of PRBs per scheduled block and $N_{PRB}$ is the number of schedulable PRBs. Using this quantization function, it follows that:

$$\bar{P}_{blank} = 10\log\left(\lvert h_p\rvert^2\left(P_{max}10^{\frac{\lfloor\bar{u}\rfloor_{\bar{Q}_{1,1}}}{10}}\right)^n\right) = 20\log(\lvert h_p\rvert) + 10n\log(P_{max}) + n\lfloor\bar{u}\rfloor_{\bar{Q}_{1,1}}$$

This explains the factor n (implemented in the PIM generation module 440) in the block diagram of FIG. 4. The bracket $\lfloor\cdot\rfloor$ denotes the integer floor function (implemented in the logarithmic muting module 420).

Since $n\lfloor\bar{u}\rfloor_{\bar{Q}_{1,1}}$ (implemented in the logarithmic muting module 420) defines the fraction of transmission resources to which the transmission power reduction factor is to be applied, in some embodiments, the fraction of transmission resources further is thus determined as a function of control parameters of the feedback control loop. For example, the uplink PIM has an order n, and the control parameters depend on the order n of the uplink PIM.

In some aspects, probing (implemented in the filtering module 460) is used to measure the effect of applying the transmission power reduction factor. In some embodiments, the probing is performed to measure the effect of applying the transmission power reduction factor, with an objective to not apply the transmission power reduction factor to more transmission resources than needed for the uplink PIM to maintain close to the reference value. Further, in some embodiments, probing the radio channel comprises comparing uplink interference, including the uplink PIM, resulting from not applying the transmission power reduction factor to any of the transmission resources within the transmission slot and uplink interference, including the uplink PIM, resulting from continuously applying the transmission power reduction factor to all the transmission resources within the transmission slot. The block diagram of FIG. 4 illustrates such probing implemented in two filtering modules 450 and 460, one applied during normal operation (module 450) and one when a maximum transmission power reduction factor is applied (module 460). Hence, in some embodiments, when probing the radio channel, the uplink interference, including the uplink PIM, resulting from not applying the transmission power reduction factor to any of the transmission resources is filtered with a first filter and the uplink interference, including the uplink PIM, resulting from continuously applying the transmission power reduction factor to all the transmission resources within the transmission slot is filtered with a second filter. Since application of the maximum transmission power reduction factor removes the effect of the uplink PIM, the other block measures the total effect of interference, noise and uplink PIM. The difference between the outputs of the two blocks thus represents the power caused by the uplink PIM. This quantity is $\overline{\langle \Delta P_{PIM} \rangle}$, which is the quantity that is controlled.

In some embodiments, the feedback control loop meets global stability criteria that depend on the order n of the uplink PIM. There might be different conditions for the feedback control loop to meet the global stability criteria. In some examples, the proportional gain $\bar{K}_P$ is determined from the global stability criteria. Particularly, the proportional gain $\bar{K}_P$ might be determined such that:

$$\left(n\frac{\bar{K}_P}{\bar{T}_I}\right)((m_c+m_p)t_{TTI})<\theta$$

Here, as above, $t_{TTI}$ is the length of the transmission slot, n is the order of the uplink PIM, $\bar{T}_I$ is the integration time of the feedback control loop, $m_c$ is an integer, $m_p$ is an integer, and θ is a global stability constant. In some non-limiting examples, θ=1.6, in more conservative examples, θ=1.0, The integral feedback control loop can thus be globally stable, provided that the above loop-gain-loop-delay product stability condition holds. Having a globally stable feedback control loop is advantageous, since it is then known that the controller will always perform its task successfully, no matter what the measured uplink PIM would be.

In some aspects, the above global stability condition is used for configuration of the integral feedback control loop, where the only uplink PIM related prior knowledge that is needed is a bound on the maximal PIM order. This information is often known from measurements. Typically, the delays are also known. The integration time of the controller can then be selected as a kind of filtering time. The integration time sets the speed of the controller. A small value gives more noisy control than a larger value. The gain $\bar{K}_P$ can then be computed from the stability condition, followed by a preferred reduction to obtain a stability margin. This completes the configuration of the control loop.

Figure 6:
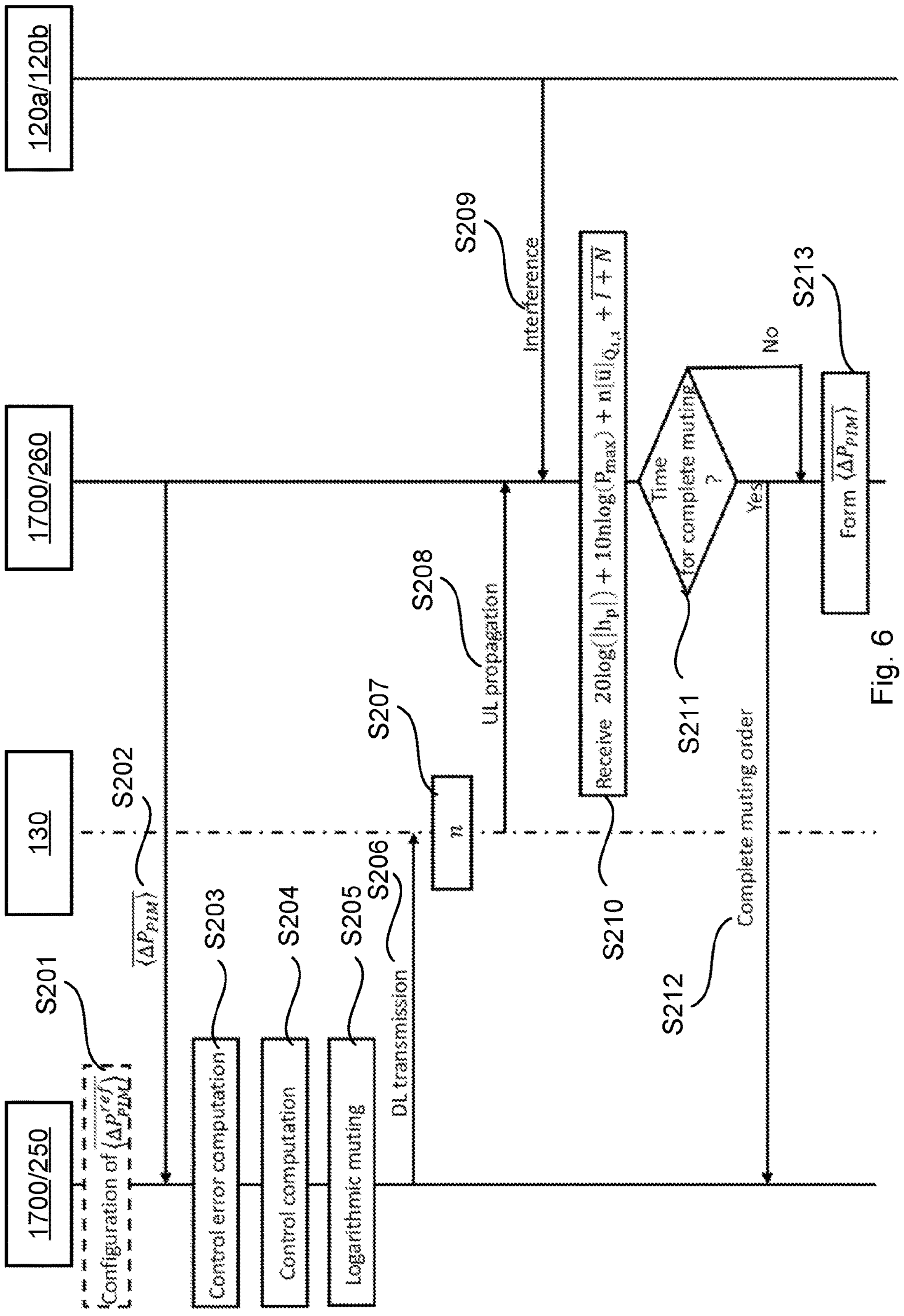
FIG. 6 is a signalling diagram of a method according to an embodiment.

Reference is next made to the signalling diagram of FIG. 6. If not otherwise stated, all values, and all computations, are in the logarithmic domain.

S201: The reference value for the uplink PIM improvement, $$\overline{\langle \Delta P_{PIM}^{ref} \rangle},$$

is configured.

S202: A measured uplink PIM improvement value $$\overline{\langle \Delta P_{PIM} \rangle}$$

is received.

S203: The control error $\bar{e}$ is computed.

S204: The control signal $\bar{u}$ is computed.

S205: The value of $\lfloor \bar{u} \rfloor_{\bar{Q}_{1,1}}$ is computed.

In some examples, S202-S205 are performed as part of S102.

S206: The value of $\bar{P}_{blank}$ is computed and a signal is transmitted in the downlink as in S104.

S207: The signal transmitted in the downlink is subjected to PIM of order n.

S208: The signal as subjected to the PIM is propagated in the uplink.

S209: Interference I is received from user equipment 120*a*, 120*b*.

S210: A signal 20 log $(|h_p|)$+10n log$(P_{max})$+n$\lfloor \bar{u} \rfloor_{\bar{Q}_{1,1}}$+$\overline{I+N}$is received.

S211: It is determined if it is time for muting all PRBs in the next transmission slot. If Yes, step S212 is entered. Else step S213 is entered.

S212: The control signal is set to mute all PRBs in the next transmission slot. Step S206 can then be entered again for the next transmission slot.

S213: A new measured uplink PIM improvement value $\overline{\langle \Delta P_{PIM} \rangle}$ is received for the next transmission slot. Step S203 can then be entered again for the next transmission slot.

Figure 7:
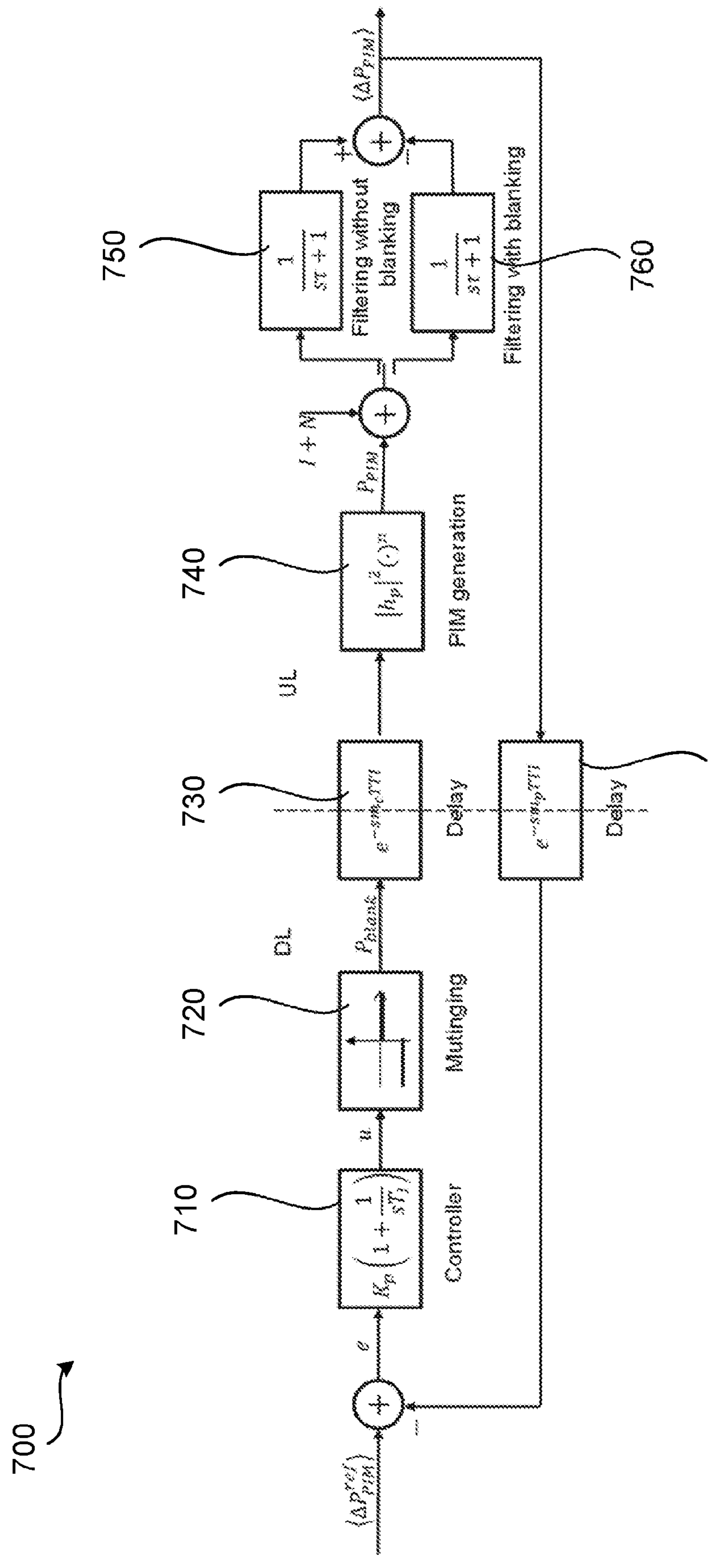
FIG. 7 is a block diagram of a controller implementing a control loop according to an embodiment.

To explain some benefits of the above disclosed embodiments, reference is for comparisons next made to the block diagram of an example feedback control loop 700 illustrated in FIG. 7. The feedback control loop 700 is executed in the linear domain. This block diagram thus represents the physical starting point, where, in contrast to the above disclosed embodiments, all quantities are represented in the linear power domain. Module 7*x*0 corresponds to module 4*x*0, where x=1, 2, 3, 4, 5, 6, 7 but where operations in module 7*x*0 are performed in the linear domain. That is, module 710 corresponds to module 410, etc. One advantage of replacing traditional control as applied in the linear domain (as in FIG. 7) with control applied in the logarithmic domain (as in FIG. 4) results from the transformation of the PIM generation module from the factor $|h_p|2(\bullet)^n$ (as in module 740) in the linear domain to simply the factor n in the logarithmic domain (as in module 440). This follows from the equation derived above stating:

$$\bar{P}_{blank} = 10\log\left(|h_p|^2\left(P_{max}10^{\frac{\lfloor u\rfloor_{\bar{Q}_{1,1}}}{10}}\right)^n\right) = 20\log(|h_p|) + 10n\log(P_{max}) + n\lfloor u\rfloor_{\bar{Q}_{1,1}}.$$

The fact that only the factor n (instead of the factor $|h_p|^2(\bullet)^n$) appears in the loop gain leads to the above global stability criterion and tuning only in terms of the factor n. In the linear domain the PIM channel gain appears in the loop and therefore also in the corresponding linear domain stability criterion:

$$\left(|h_{p,max}|P_{max}^n u_{max}^{n-1}\frac{K_p}{T_I}\right)((m_c+m_p)TTI) < \theta$$

The tuning of the controller in the linear domain therefore requires knowledge of the PIM channel. Since the PIM channel is very computationally complex to estimate, it follows that logarithmic feedback control of the uplink PIM as disclosed above also offers a significantly lower implementational complexity than traditional control in the linear domain.

Figure 8:
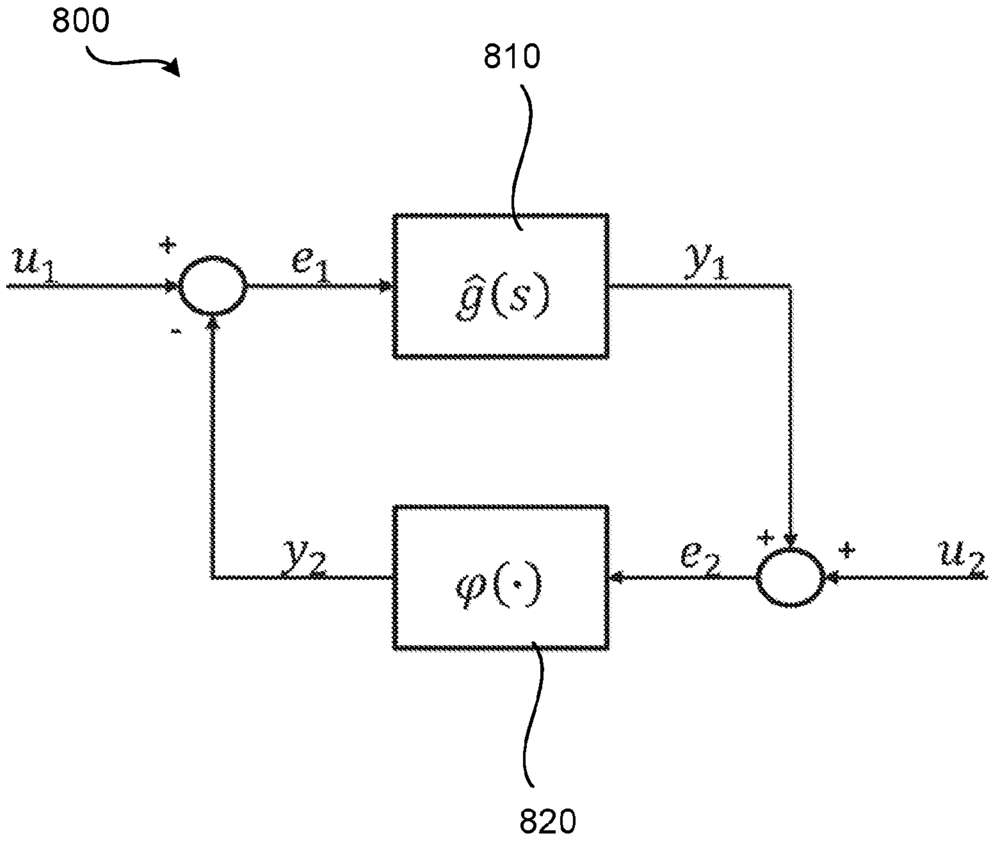
FIG. 8 is a block diagram for which the Circle and Popov stability criteria hold.

In general terms, a feedback control system that is stable does not exhibit un-desired oscillation in terms of limit cycles, nor does it risk signal run-away. Stability may be local or global. If a feedback control system is locally stable, the stability holds in a restricted part of the state space, while global stability means that the stability holds irrespectively of where the system state may be. Thus, to be guaranteed to be always stable, the desired stability property of any engineering system is global stability. It is well known how to analyse stability for linear systems, however for non-linear systems the understanding and available methods to investigate stability are more limited. For non-linear systems with a certain structure, methods are available. As will become clear the infinite dimensional variants of the Circle and Popov-criteria will be of particular interest. These results enable mathematical proof of global stability for dynamic systems containing delays and static non-linear elements in the feedback path. Reference is here made to the block diagram 800 of FIG. 8 for which the Circle and Popov criteria hold. In FIG. 8, $\hat{g}(s)$ as implemented in loop gain module 810 is the loop gain, $\varphi(\bullet)$ as implemented in function module 820 is a static nonlinear continuous function. Further, $y_1$ and $y_2$ are output signals, $e_1$ and $e_2$ are error signals, and $u_1$ and $u_2$ represents reference signals, feed-forward signals, disturbance signals, or combinations thereof. It is also assumed that the nonlinear element fulfils a sector condition. According to the Sector condition, a continuous function $\varphi: R \rightarrow R$ is said to belong to the sector $[\alpha, \beta]$, $\alpha \le \beta$, if:

$$ax^2 \le x\varphi(x) \le \beta x^2,$$

or, equivalently:

$$a \le \frac{\varphi(x)}{x} \le \beta$$

Here x denotes any independent variable.

The Circle and Popov criteria are then given as follows.

The Circle Criterion: Consider the feedback system of FIG. 3 with $$\hat{g}(s) = \hat{g}_a(s)$$

where $\hat{g}_a \in \hat{A}$ and where $\varphi(\bullet)$ is continuous and belongs to the sector $[\alpha, \beta]$. Then if $0=\alpha<\beta$, $\hat{g}(s)$ has no poles in the right half plane, and $$inf_{\omega \in R}\ \mathrm{Re}(\hat{g}(j\omega)) > -\frac{1}{\beta},$$

then the closed loop system is globally $L_2$-stable.

The Popov criterion: Consider the feedback system of FIG. 3 where $g(\bullet)$, $\in A$, $\dot{g}(\bullet) \in A$, $\varphi(\bullet)$ is continuous and belongs to the sector $[0, k]$, $u_1 \in E\,L_2$, $u_2 \in L_2$, $\dot{u}_2 \in L_2$. Then if there exists $q \ge 0$, $\delta > 0$, such that $$\mathrm{Re}((1+j\omega q)\hat{g}(j\omega)) > -\frac{1}{k} + \delta > 0,$$

then the closed loop system is $L_2$-stable.

Figure 9:
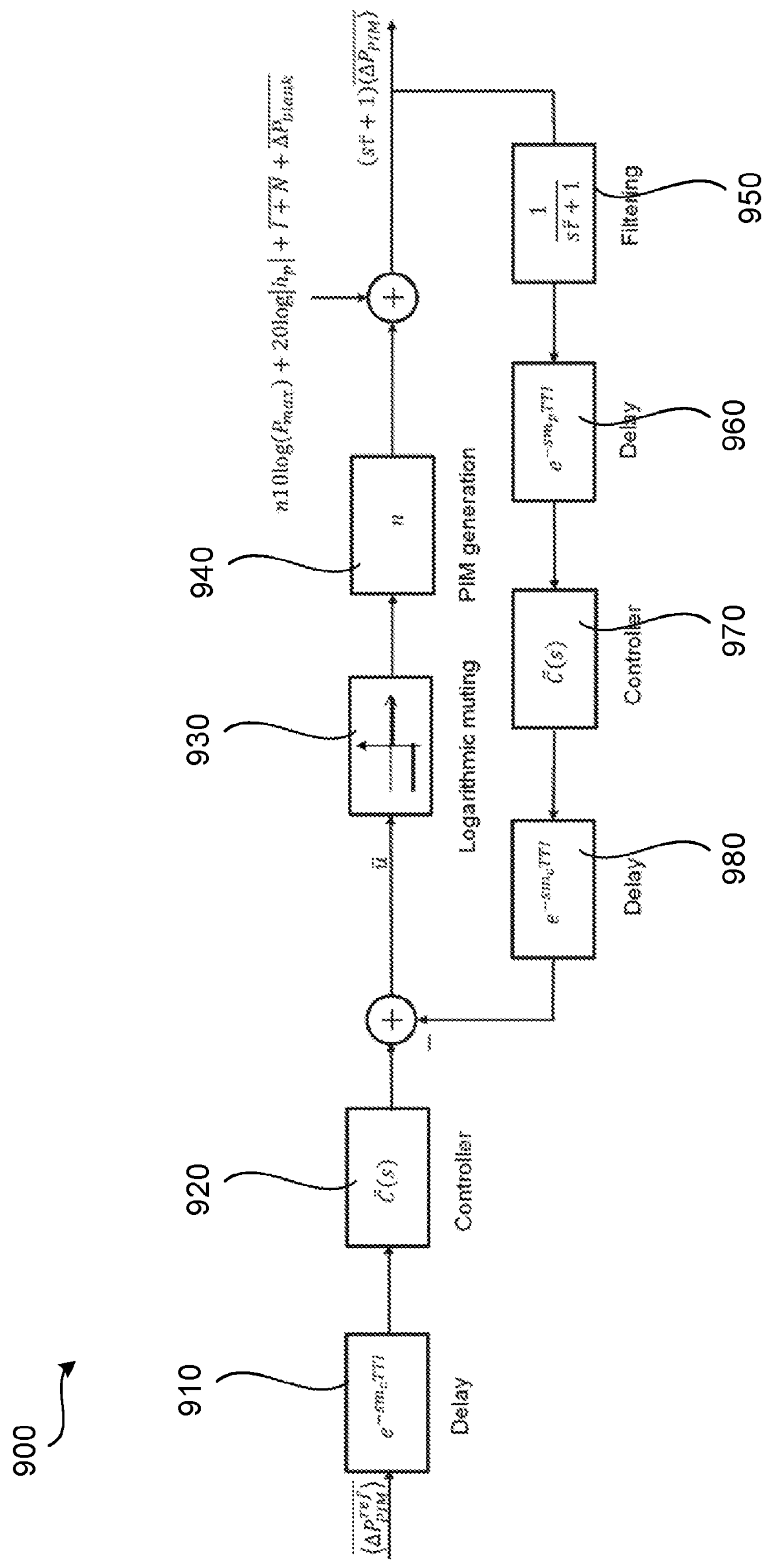
FIG. 9 is a block diagram of a controller implementing a control loop according to an embodiment.

Noting that delays can be interchanged with static non-linear functions, it follows that the block diagram of FIG. 4 can be re-drawn into the block diagram of FIG. 9. In FIG. 9 is shown a block diagram of a feedback control loop 900 as implemented by the controller according to embodiments disclosed herein. The feedback control loop 900 is executed in the logarithmic domain. By comparing FIG. 8 and FIG. 9, the following quantities result:

$$u_1(s) = n10\log(P_{max}) + 20\log|h_p| + \overline{I+N} + \overline{\Delta P_{blank}}$$

$$u_2(s) = e^{-sm_c TTI}\bar{C}(s)\overline{\left\langle P_{PIM}^{ref}\right\rangle}(s)$$

$$\hat{g}(s) = e^{-s(m_c+m_p)TTI}\frac{1}{s\bar{\tau}+1}\bar{C}(s)$$

$$\varphi(\bar{u}) = n\lfloor\bar{u}\rfloor_{\bar{Q}_{1,1}}$$

The following assumptions B1 and B2 are introduced:

B1: $\bar{C}(s)$ (implemented in controller module 920) is proper and asymptotically stable. This implies that s is replaced by $s+\bar{\delta}$, for some small $\bar{\delta}$, in the PI controller.

B2: $\lfloor\bar{u}\rfloor_{\bar{Q}_{1,1}}$ (implemented in the logarithmic muting module 930) is bounded from below by a continuous function with rounded corners, $\lfloor\bar{u}\rfloor_{\bar{Q}_{1,1,\varepsilon}}$.

The Circle criterion is then applicable since $\hat{g}(s)$ is asymptotically stable by condition B1 and strictly proper by condition B1, and hence $\hat{g} \in \hat{A}$, where s denotes the Laplace transform of the set of asymptotically stable and proper transfer functions. In addition, $\varphi(\bar{u})$ is continuous by condition B2.

To proceed with the analysis the following conditions B3 and B4 related to the sector condition are introduced:

B3: The last quantization step occurs for $\bar{u}=\bar{u}_{max}<0$.

B4: A bound on the PIM order, n (as implemented by the PIM generation module 940), is known.

To obtain analytical results, useful for tuning the special case of pure integral control without filtering (as implemented by filtering module 960) being considered, this means that:

$$\bar{C}(s) = \frac{\bar{K}_p}{\bar{T}_I}\frac{1}{S}, \text{ and}$$

$$\bar{\tau} = 0$$

This case is also practically relevant since integration provides filtering as well. In this case a direct calculation shows that the Circle criterion results in the stability condition:

$$-\sin((m_c+m_p)\omega TTI) > -\frac{\omega}{\left(\frac{\bar{K}_p}{\bar{T}_I}\right)n} = -\frac{(m_c+m_p)\omega TTI}{\left(\frac{\bar{K}_p}{\bar{T}_I}n\right)((m_c+m_p)TT1)}, \forall \omega$$

It can be seen from the above expression that the total controller gain $$\frac{\bar{K}_p}{\bar{T}_I}n$$

affects the stability, and that the gain can be arbitrarily distributed between the controller (in modules 920, 970) and the quantizer (as implemented by the logarithmic muting module 930). A further analysis of the stability condition can be done. It is noted that $-\sin((m_c+m_p)\omega TTI)$ and $$-\frac{\omega}{\left(\frac{\bar{K}_p}{\bar{T}_I}\right)n}$$

intersect at $\omega=0$. If the slope of $-\sin((m_c+m_p)\omega TTI)$ is less negative than $$-\frac{1}{\left(\frac{\bar{K}_p}{\bar{T}_I}\right)n}$$

in $\omega=0$, there will be no intersections for $$\omega > 0 \text{ since } \frac{d}{d\omega}(-\sin((m_c+m_p)\omega TTI))$$

is minimal in $\omega=0$. Hence the following criterion implies that the Circle criterion is fulfilled:

$$-(m_c+m_p)TTI > -\frac{1}{\left(\frac{\bar{K}_p}{\bar{T}_I}\right)n}$$

This is equivalent to the following loop-gain-loop-delay criterion implemented in delay modules 910, 960, 980:

$$\left(\left(\frac{\bar{K}_p}{\bar{T}_I}\right)n\right)(m_c+m_p)TTI < 1$$

This criterion is useful for tuning, as pointed out above. However, it can be made less conservative by an application of the Popov criterion. To use the Popov criterion the following additional conditions B5, B6, B7, and B8 are introduced:

B5: The interference and noise $\overline{I+N}$ is input output stable in $L_2$.

B6: The PIM channel gain 20 log ($|h_p|$) is input output stable in $L_2$.

B7: $\overline{\Delta P_{blank}}$ is input output stable in $L_2$.

B8:

$$\overline{\langle \Delta P_{PIM}^{ref} \rangle}(s)$$

is input output stable in $L_2$.

The Popov criterion is then applicable since $\hat{g}(s)$ is asymptotically stable by condition B1 and strictly proper by condition B1, and hence $\hat{g} \in \hat{A}$ and $\dot{\hat{g}} \in \hat{A}$, $\varphi(u)$ is continuous by condition B2, $u_1$ and $u_2$ are in $L_2$ by conditions B1, B5-B8, and $\dot{u}_2$ is in $L_2$ by conditions B1, B5-B8.

A direct computation then gives the Popov curve:

$$\mathrm{Re}(k\hat{g}(j\omega)) = -n\frac{\bar{K}_p}{\bar{T}_I}\frac{\sin((m_c+m_p)\omega TTI)}{\omega} = -\left(\left(n\frac{\bar{K}_p}{\bar{T}_I}\right)(m_c+m_p)TTI\right)\frac{\sin((m_c+m_p)TTI\omega)}{(m_c+m_p)TTI\omega},$$

$$\omega\mathrm{Im}(k\hat{g}(j\omega)) = -\left(n\frac{\bar{K}_p}{\bar{T}_I}\right)((m_c+m_p)TTI)\frac{\cos((m_c+m_p)TTI\omega)}{(m_c+m_p)TTI}$$

The Popov curve can now be numerically evaluated.

A closer study of the stability limit case, results in the above stability condition:

$$\left(n\frac{\bar{K}_p}{\bar{T}_I}\right)((m_c+m_p)TTI) < \theta$$

In this section the metric $\overline{\langle \Delta P_{PIM} \rangle}$ was used as the metric that would be set as the reference input to the controller, and is the measurement that is used directly by the controller. It can be appreciated that there are other difference metrics that can be used to measure the impact of the uplink PIM with and without application of the transmission power reduction factor.

In some aspects, the value of $$\overline{\langle \Delta P_{PIM}^{ref} \rangle}$$

is automatically set using another measurement. In one example, the value of $$\overline{\langle \Delta P_{PIM}^{ref} \rangle}$$

is selected so that the resulting level of PIM is 3 dB below the interference plus noise that is not due to the uplink PIM.

Simulation results will be disclosed next with reference to FIGS. 10-17. Results for an I controller are shown in FIGS. 10-13, and results for a PI controller are shown in FIGS.

Figure 10:
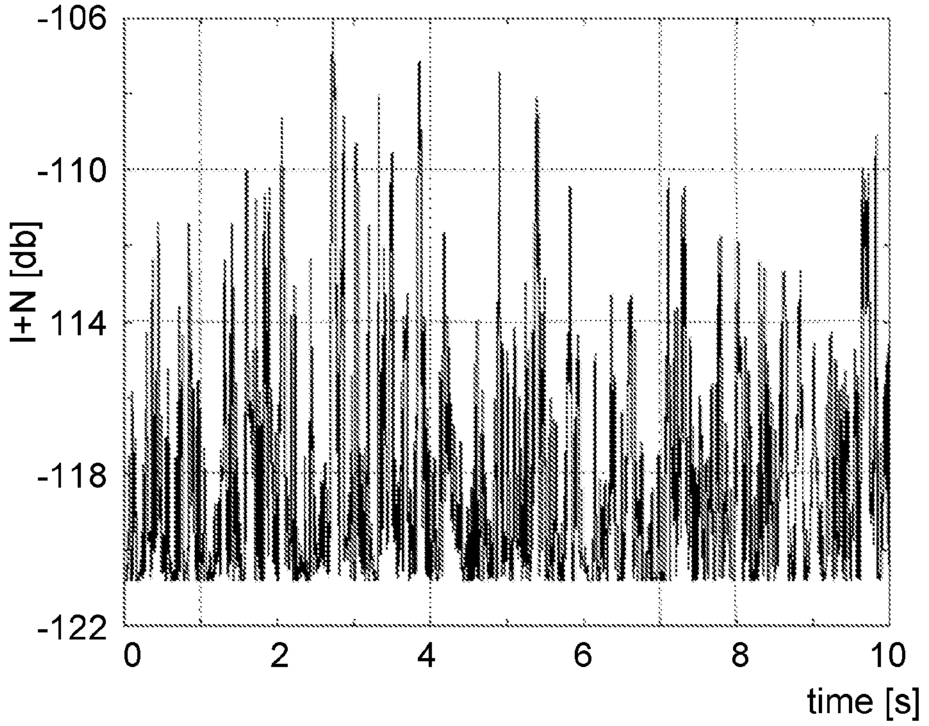
FIGS. 10-17 shows simulation results according to embodiments.
Figure 11:
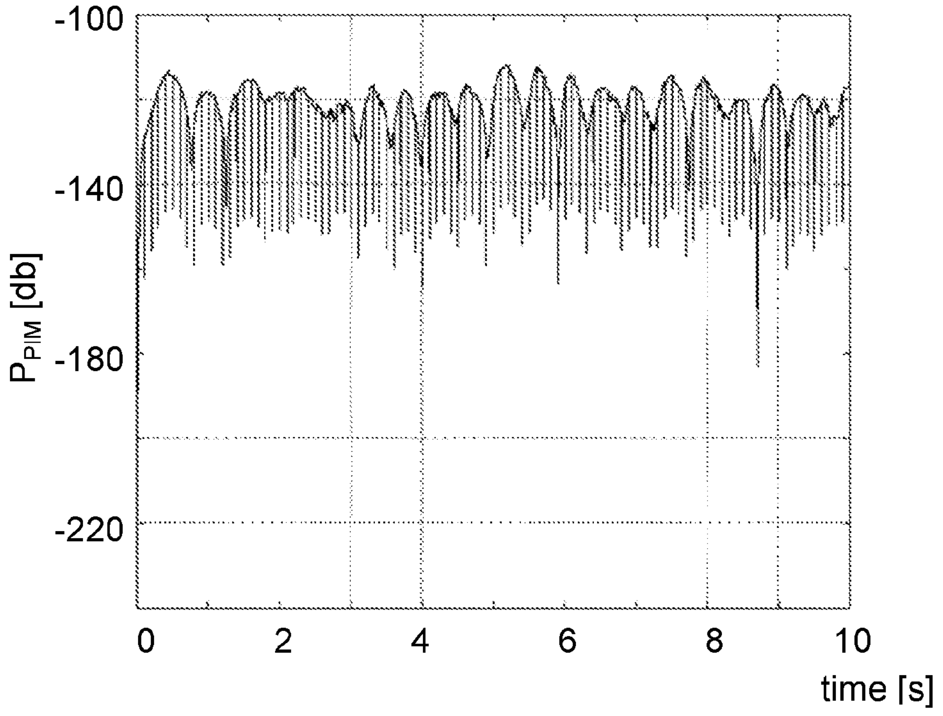
Figure 12:
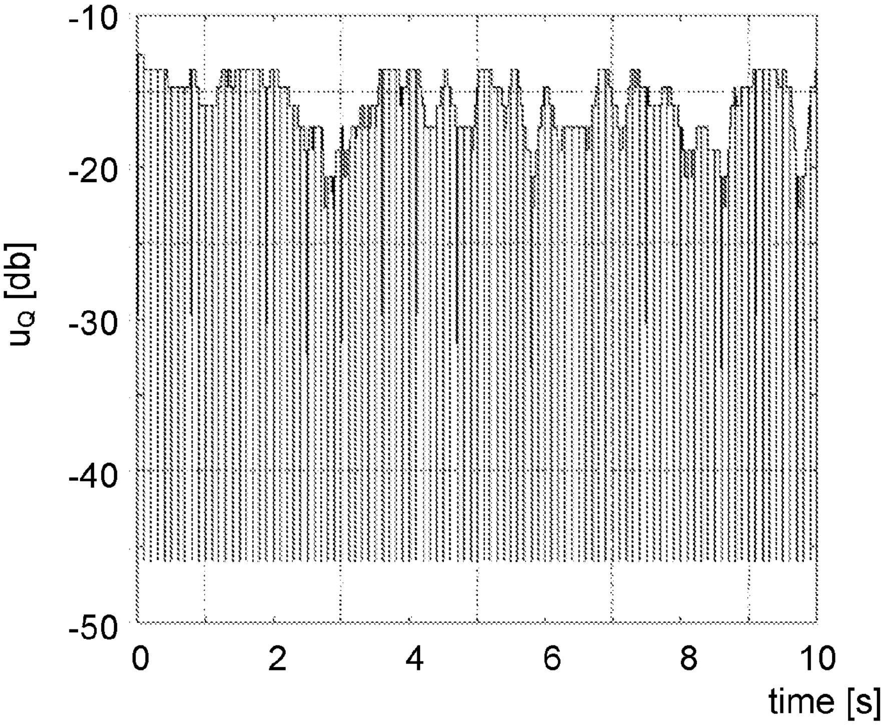
Figure 13:
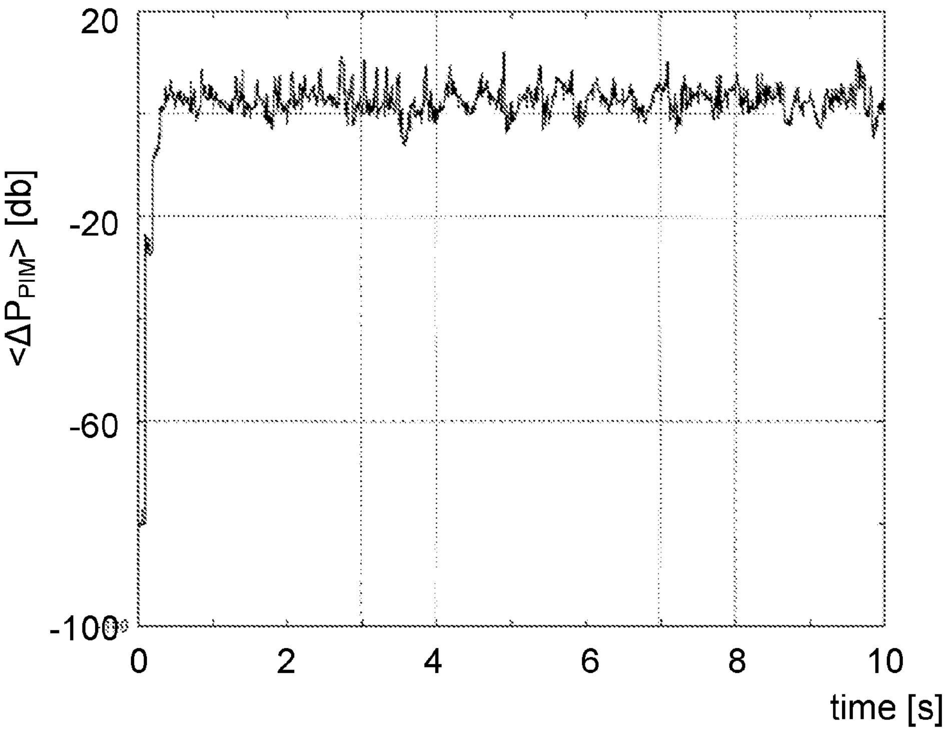
Figure 14:
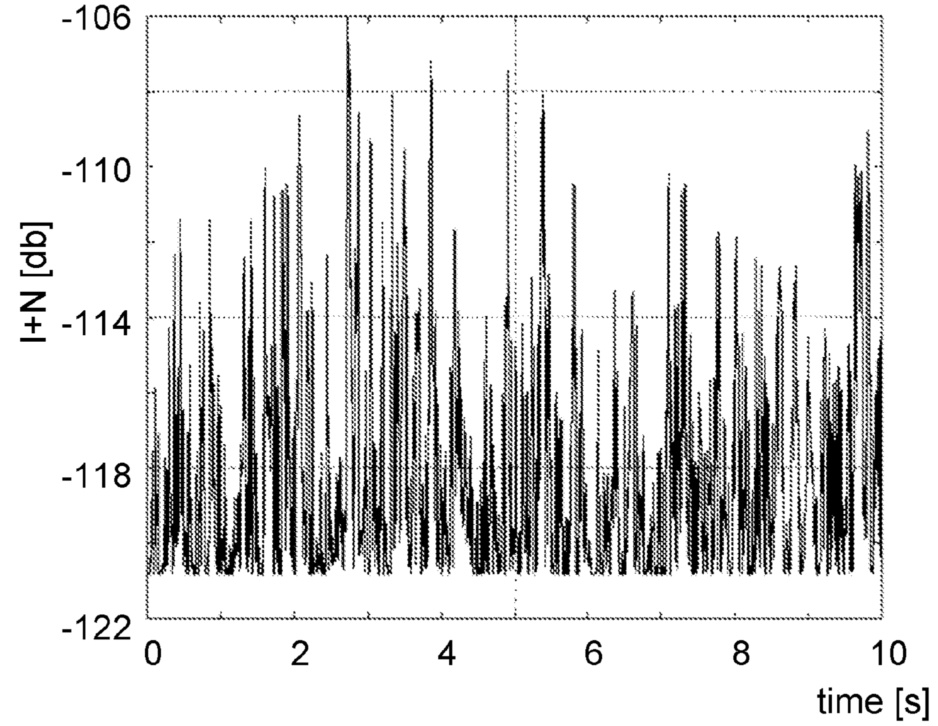
Figure 15:
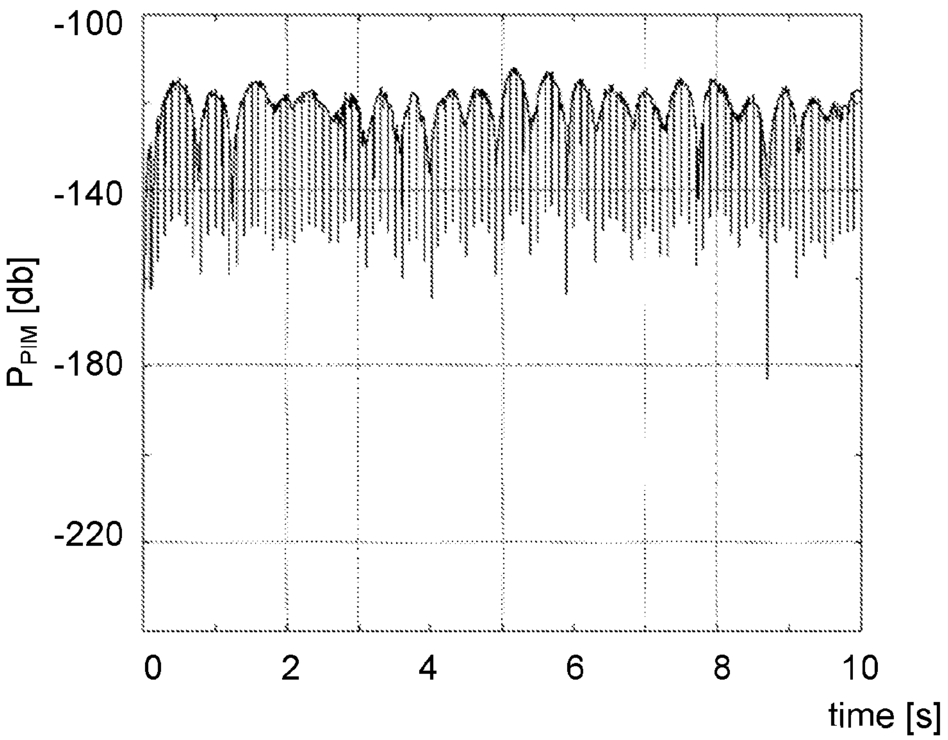
Figure 16:
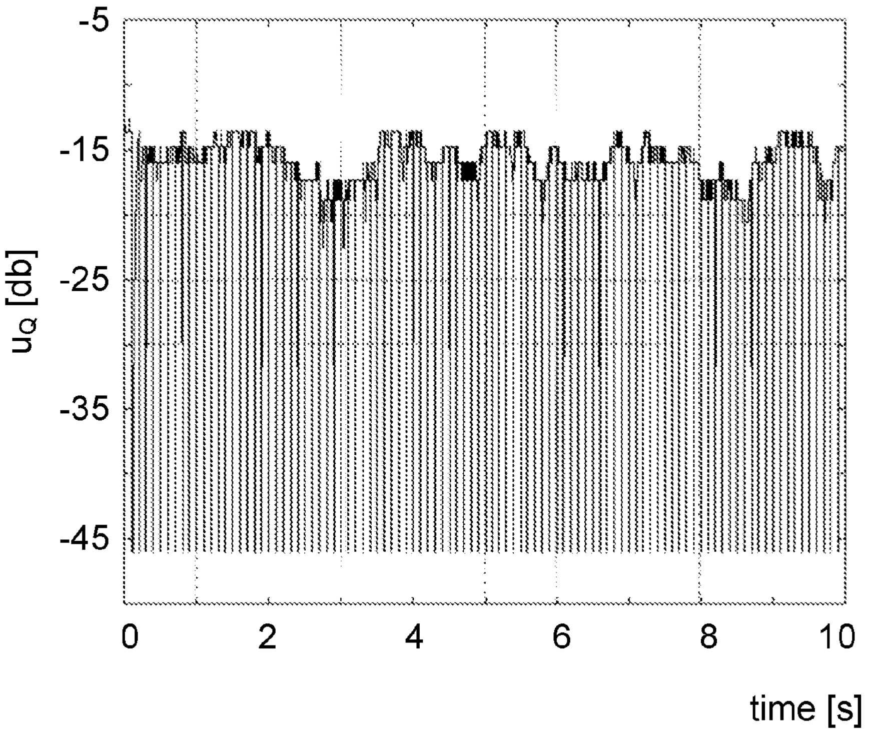
Figure 17:
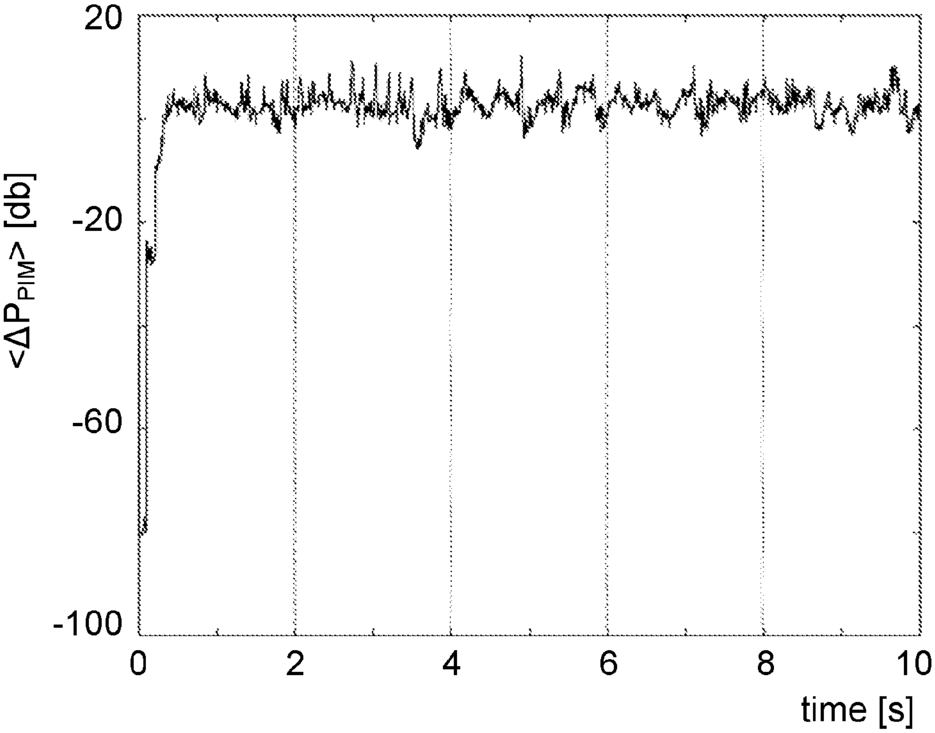

14-17. Numerical values used during the simulations are listed in Table 2. The received interference plus noise as a function of time is shown in FIG. 10 for the I controller and in FIG. 14 for the PI controller. The received PIM power as a function of time is shown in FIG. 11 for the I controller and in FIG. 15 for the PI controller. The control signal as a function of time is shown in FIG. 12 for the I controller and in FIG. 16 for the PI controller. The measured uplink PIM improvement as a function of time is shown in FIG. 13 for the I controller and in FIG. 17 for the PI controller.

TABLE 2

List of numerical values used during simulations

| Parameter | Value |
|---|---|
| Bandwidth | 100 MHZ, 272 PRBs |
| $T_S$ | 0.001 s |
| $m_c$ | 2 |
| $m_p$ | 2 |
| Probing period | 0.1 s |
| $\langle P_{PIM}^{ref} \rangle$ | 3 dB |
| $\overline{K}_P$ | 2.0047 |
| $\overline{T}_I$ | 0.030 s |
| Muting block size | 8 PRBs |
| n | 3 |

It can be concluded from the figures that the control loops for both I and PI controllers are globally stable and perform as intended. Using the PI controller results in a lower fraction of PRBs being muted and also provides better regulation.

Figure 18:
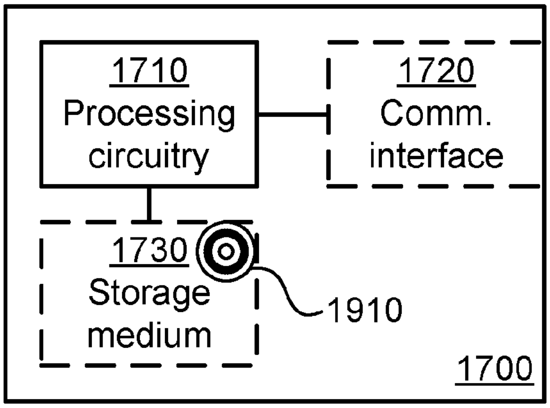
FIG. 18 is a schematic diagram showing functional units of a controller according to an embodiment.

FIG. 18 schematically illustrates, in terms of a number of functional units, the components of a controller 1700 according to an embodiment. Processing circuitry 1710 is provided using any combination of one or more of a suitable central processing unit (CPU), multiprocessor, microcontroller, digital signal processor (DSP), etc., capable of executing software instructions stored in a computer program product 1910 (as in FIG. 20), e.g. in the form of a storage medium 1730. The processing circuitry 1710 may further be provided as at least one application specific integrated circuit (ASIC), or field programmable gate array (FPGA).

Particularly, the processing circuitry 1710 is configured to cause the controller 1700 to perform a set of operations, or steps, as disclosed above. For example, the storage medium 1730 may store the set of operations, and the processing circuitry 1710 may be configured to retrieve the set of operations from the storage medium 1730 to cause the controller 1700 to perform the set of operations. The set of operations may be provided as a set of executable instructions.

Thus the processing circuitry 1710 is thereby arranged to execute methods as herein disclosed. The storage medium 1730 may also comprise persistent storage, which, for example, can be any single one or combination of magnetic memory, optical memory, solid state memory or even remotely mounted memory. The controller 1700 may further comprise a communications interface 1720 at least configured for communications with other entities, functions, and devices. As such the communications interface 1720 may comprise one or more transmitters and receivers, comprising analogue and digital components. The processing circuitry 1710 controls the general operation of the controller 1700 e.g. by sending data and control signals to the communications interface 1720 and the storage medium 1730, by receiving data and reports from the communications interface 1720, and by retrieving data and instructions from the storage medium 1730. Other components, as well as the related functionality, of the controller 1700 are omitted in order not to obscure the concepts presented herein.

Figure 19:
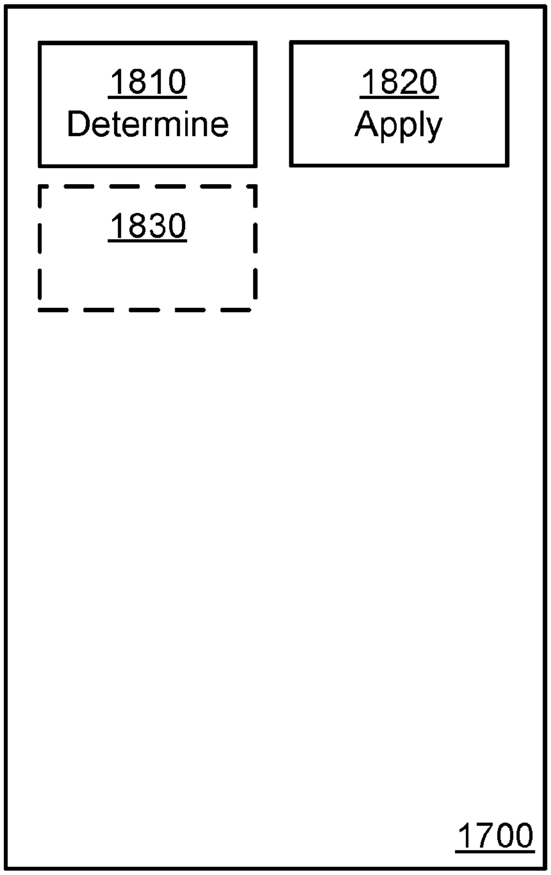
FIG. 19 is a schematic diagram showing functional modules of a controller according to an embodiment.

FIG. 19 schematically illustrates, in terms of a number of functional modules, the components of a controller 1700 according to an embodiment. The controller 1700 of FIG. 19 comprises a number of functional modules; a determine module 1810 configured to perform step S102, and an apply module 1820 configured to perform step S104. The controller 1700 of FIG. 19 may further comprise a number of optional functional modules, such as represented by functional module 1830. In general terms, each functional module 1810:1830 may in one embodiment be implemented only in hardware and in another embodiment with the help of software, i.e., the latter embodiment having computer program instructions stored on the storage medium 1730 which when run on the processing circuitry makes the controller 1700 perform the corresponding steps mentioned above in conjunction with FIG. 18. It should also be mentioned that even though the modules correspond to parts of a computer program, they do not need to be separate modules therein, but the way in which they are implemented in software is dependent on the programming language used. Preferably, one or more or all functional modules 1810:1830 may be implemented by the processing circuitry 1710, possibly in cooperation with the communications interface 1720 and/or the storage medium 1730. The processing circuitry 1710 may thus be configured to from the storage medium 1730 fetch instructions as provided by a functional module 1810:1830 and to execute these instructions, thereby performing any steps as disclosed herein.

The controller 1700 may be provided as a standalone device or as a part of at least one further device. For example, the controller 1700 may be provided in a node of an access network or in a node of a core network. Alternatively, functionality of the controller 1700 may be distributed between at least two devices, or nodes. These at least two nodes, or devices, may either be part of the same network part (such as the access network or the core network) or may be spread between at least two such network parts. In general terms, instructions that are required to be performed in real time may be performed in a device, or node, operatively closer to the cell than instructions that are not required to be performed in real time. Thus, a first portion of the instructions performed by the controller 1700 may be executed in a first device, and a second portion of the of the instructions performed by the controller 1700 may be executed in a second device; the herein disclosed embodiments are not limited to any particular number of devices on which the instructions performed by the controller 1700 may be executed. Hence, the methods according to the herein disclosed embodiments are suitable to be performed by a controller 1700 residing in a cloud computational environment. Therefore, although a single processing circuitry 1710 is illustrated in FIG. 18 the processing circuitry 1710 may be distributed among a plurality of devices, or nodes. The same applies to the functional modules 1810:1830 of FIG. 19 and the computer program 1920 of FIG. 20.

Figure 20:
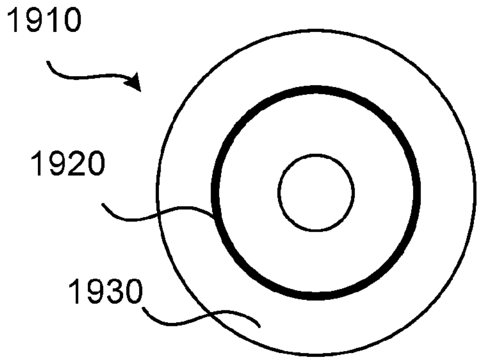
FIG. 20 shows one example of a computer program product comprising computer readable storage medium according to an embodiment.

FIG. 20 shows one example of a computer program product 1910 comprising computer readable storage medium 1930. On this computer readable storage medium 1930, a computer program 1920 can be stored, which computer program 1920 can cause the processing circuitry 1710 and thereto operatively coupled entities and devices, such as the communications interface 1720 and the storage medium 1730, to execute methods according to embodiments described herein. The computer program 1920 and/or computer program product 1910 may thus provide means for performing any steps as herein disclosed.

In the example of FIG. 20, the computer program product 1910 is illustrated as an optical disc, such as a CD (compact disc) or a DVD (digital versatile disc) or a Blu-Ray disc. The computer program product 1910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1920 is here schematically shown as a track on the depicted optical disk, the computer program 1920 can be stored in any way which is suitable for the computer program product 1910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for passive intermodulation, PIM, avoidance, the method being performed by a controller, the method comprising:

determining, based on presence of uplink PIM, to which fractions of transmission resources within a transmission slot a transmission power reduction factor is to be applied, the fraction of transmission resources being, in a logarithmic domain and according to a feedback control loop, determined as a function of a comparison between a measured improvement of the uplink PIM when having applied the transmission power reduction factor in a most recent transmission slot and a reference value for the improvement of the uplink PIM, and the measured improvement of the uplink PIM being given by, in each transmission slot, probing a radio channel over which the uplink PIM is received; and applying the transmission power reduction factor to the determined fraction of transmission resources within the transmission slot during transmission of a signal.

2. The method according to claim 1, wherein the fraction of transmission resources further is determined as a function of control parameters of the feedback control loop.

3. The method according to claim 2, wherein the uplink PIM has an order n, and wherein the control parameters depend on the order n of the uplink PIM.

4. The method according to claim 1, wherein the probing is performed to measure the effect of applying the transmission power reduction factor, with an objective to not apply the transmission power reduction factor to more transmission resources than needed for the uplink PIM to maintain close to the reference value.

5. The method according to claim 1, wherein probing the radio channel comprises comparing uplink interference, including the uplink PIM, resulting from not applying the transmission power reduction factor to any of the transmission resources within the transmission slot and uplink interference, including the uplink PIM, resulting from continuously applying the transmission power reduction factor to all the transmission resources within the transmission slot.

6. The method according to claim 5, wherein, when probing the radio channel, the uplink interference, including the uplink PIM, resulting from not applying the transmission power reduction factor to any of the transmission resources is filtered with a first filter and the uplink interference, including the uplink PIM, resulting from continuously applying the transmission power reduction factor to all the transmission resources within the transmission slot is filtered with a second filter.

7. The method according to claim 1, wherein the probing is performed between once every 10th to once every 1000th transmission slot, preferably between once every 25th to every 400th transmission slot, more preferably between once every 50th to once every 150th transmission slot, even more preferably between once every 75th to once every 125th transmission slot.

8. The method according to claim 1, wherein the feedback control loop is an integral feedback control loop.

9. The method according to claim 1, wherein the feedback control loop is a proportional integral feedback control loop.

10. The method according to claim 1, wherein the feedback control loop meets global stability criteria that depend on the order n of the uplink PIM.

11. The method according to claim 10, wherein the feedback control loop has a proportional gain $\bar{K}_p$, and wherein the proportional gain $\bar{K}_p$ is determined from the global stability criteria.

12. The method according to claim 11, wherein the proportional gain $\bar{K}_p$ is determined such that:

$$\left(n\frac{\bar{K}_p}{\bar{T}_I}\right)((m_c+m_p)t_{TTI})<\theta$$

where $t_{TTI}$ is the length of the transmission slot, n is the order of the uplink PIM, $\bar{T}_I$ is the integration time of the feedback control loop, $m_c$ is an integer, $m_p$ is an integer, and θ is a global stability constant.

13. A controller for passive intermodulation, PIM, avoidance, the controller comprising processing circuitry, the processing circuitry being configured to cause the controller to:

determine, based on presence of uplink PIM, to which fractions of transmission resources within a transmission slot a transmission power reduction factor is to be applied, the fraction of transmission resources being, in a logarithmic domain and according to a feedback control loop, determined as a function of a comparison between a measured improvement of the uplink PIM when having applied the transmission power reduction factor in a most recent transmission slot and a reference value for the improvement of the uplink PIM, and the measured improvement of the uplink PIM being given by, in each transmission slot, probing a radio channel over which the uplink PIM is received; and apply the transmission power reduction factor to the determined fraction of transmission resources within the transmission slot during transmission of a signal.

14. A non-transitory computer storage medium storing a computer program for passive intermodulation, PIM, avoidance, the computer program comprising computer code which, when run on processing circuitry of a controller, causes the controller to:

determine, based on presence of uplink PIM, to which fractions of transmission resources within a transmission slot a transmission power reduction factor is to be applied, the fraction of transmission resources being, in a logarithmic domain and according to a feedback control loop, determined as a function of a comparison between a measured improvement of the uplink PIM when having applied the transmission power reduction factor in a most recent transmission slot and a reference value for the improvement of the uplink PIM, and the measured improvement of the uplink PIM being given by, in each transmission slot, probing a radio channel over which the uplink PIM is received; and apply the transmission power reduction factor to the determined fraction of transmission resources within the transmission slot during transmission of a signal.

15. The controller according to claim 13, wherein the fraction of transmission resources further is determined as a function of control parameters of the feedback control loop.

16. The controller according to claim 15, wherein the uplink PIM has an order n, and wherein the control parameters depend on the order n of the uplink PIM.

17. The controller according to claim 13, wherein the processing circuitry performs the probing to measure the effect of applying the transmission power reduction factor, with an objective to not apply the transmission power reduction factor to more transmission resources than needed for the uplink PIM to maintain close to the reference value.

18. The controller according to claim 13, wherein probing the radio channel comprises comparing uplink interference, including the uplink PIM, resulting from not applying the transmission power reduction factor to any of the transmission resources within the transmission slot and uplink interference, including the uplink PIM, resulting from continuously applying the transmission power reduction factor to all the transmission resources within the transmission slot.

19. The controller according to claim 18, wherein, when probing the radio channel, the uplink interference, including the uplink PIM, resulting from not applying the transmission power reduction factor to any of the transmission resources is filtered with a first filter and the uplink interference, including the uplink PIM, resulting from continuously applying the transmission power reduction factor to all the transmission resources within the transmission slot is filtered with a second filter.

20. The controller according to claim 13, wherein the processing circuitry performs the probing between once every 10th to once every 1000th transmission slot, preferably between once every 25th to every 400th transmission slot, more preferably between once every 50th to once every 150th transmission slot, even more preferably between once every 75th to once every 125th transmission slot.

* * * * *